United States Patent
Yamada et al.

(10) Patent No.: US 9,391,349 B2
(45) Date of Patent: Jul. 12, 2016

(54) LITHIUM AIR SECONDARY BATTERY

(71) Applicant: NGK INSULATORS, LTD., Nagoya-Shi (JP)

(72) Inventors: Naohito Yamada, Nagoya (JP); Kazuhiro Yamamoto, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/508,160

(22) Filed: Oct. 7, 2014

(65) Prior Publication Data

US 2015/0024292 A1  Jan. 22, 2015

Related U.S. Application Data

(63) Continuation of application No. PCT/JP2013/059841, filed on Apr. 1, 2013.

(30) Foreign Application Priority Data

Apr. 26, 2012 (JP) .................................. 2012-101532

(51) Int. Cl.
*H01M 12/08* (2006.01)
*H01M 2/16* (2006.01)
(Continued)

(52) U.S. Cl.
CPC .............. *H01M 12/08* (2013.01); *C01F 7/005* (2013.01); *C01G 25/006* (2013.01); *C04B 35/486* (2013.01); *C04B 35/62685* (2013.01); *H01M 2/1646* (2013.01); *H01M 4/8605* (2013.01); *C01P 2002/22* (2013.01); *C01P 2002/50* (2013.01); *C01P 2002/54* (2013.01); *C01P 2004/50* (2013.01); *C01P 2004/61* (2013.01);
(Continued)

(58) Field of Classification Search
None
See application file for complete search history.

(56) References Cited

U.S. PATENT DOCUMENTS

2002/0102465 A1  8/2002  Chen et al.
2009/0068531 A1  3/2009  Sawa et al.
(Continued)

FOREIGN PATENT DOCUMENTS

JP   2009/016090 A   1/2009
JP   2010-176941 A   8/2010
(Continued)

OTHER PUBLICATIONS

Stevens et al. "Development of a lithium air rechargeable battery" (2010), ECS Transactions, 28 (32), pp. 1-12.*
(Continued)

*Primary Examiner* — Gregg Cantelmo
(74) *Attorney, Agent, or Firm* — Burr & Brown, PLLC

(57) ABSTRACT

The present invention provides a lithium-air secondary battery that is capable of effectively preventing deterioration of an alkaline electrolytic solution, air electrode, and negative electrode and has a long life and high long-term reliability. The lithium-air secondary battery comprises an air electrode 12 functioning as a positive electrode, an anion exchanger 14 provided in close contact with one side of the air electrode and composed of a hydroxide-ion conductive inorganic solid electrolyte, a separator 16 provided away from the anion exchanger and composed of a lithium-ion conductive inorganic solid electrolyte, a negative electrode 18 provided so as to be capable of supplying and receiving lithium ions to and from the separator and comprising lithium, and an alkaline electrolytic solution 20 filled between the anion exchanger and the separator.

17 Claims, 1 Drawing Sheet

(51) Int. Cl.
| | |
|---|---|
| H01M 4/86 | (2006.01) |
| C04B 35/486 | (2006.01) |
| C04B 35/626 | (2006.01) |
| C01G 25/00 | (2006.01) |
| C01F 7/00 | (2006.01) |
| H01M 4/38 | (2006.01) |
| H01M 4/02 | (2006.01) |

(52) U.S. Cl.
CPC ....... *C01P 2004/62* (2013.01); *C04B 2235/322* (2013.01); *C04B 2235/3203* (2013.01); *C04B 2235/3206* (2013.01); *C04B 2235/3222* (2013.01); *C04B 2235/3227* (2013.01); *C04B 2235/3251* (2013.01); *C04B 2235/44* (2013.01); *C04B 2235/764* (2013.01); *C04B 2235/77* (2013.01); *C04B 2235/96* (2013.01); *C04B 2235/9623* (2013.01); *H01M 4/382* (2013.01); *H01M 2004/027* (2013.01); *H01M 2300/0014* (2013.01); *H01M 2300/0068* (2013.01); *H01M 2300/0071* (2013.01); *Y02E 60/50* (2013.01)

(56) References Cited

U.S. PATENT DOCUMENTS

| | | |
|---|---|---|
| 2010/0047696 A1 | 2/2010 | Yoshida et al. |
| 2010/0227220 A1* | 9/2010 | Thackeray ............ H01M 4/131 429/221 |
| 2010/0323249 A1 | 12/2010 | Fujiwara et al. |
| 2011/0053000 A1 | 3/2011 | Kanamura et al. |
| 2011/0053002 A1 | 3/2011 | Yamamura et al. |
| 2011/0143259 A1* | 6/2011 | Ueda .................... H01B 1/08 429/495 |
| 2012/0028164 A1 | 2/2012 | Lee et al. |
| 2012/0328971 A1 | 12/2012 | Matsuda et al. |

FOREIGN PATENT DOCUMENTS

| | | |
|---|---|---|
| JP | 2011-051800 A | 3/2011 |
| JP | 2011-073962 A | 4/2011 |
| JP | 2011-073963 A | 4/2011 |
| JP | 2011-134628 A1 | 7/2011 |
| JP | 2011-238404 A | 11/2011 |
| JP | 2012-033490 A | 2/2012 |
| WO | 2009/104570 A1 | 8/2009 |
| WO | 2010/109670 A1 | 9/2010 |
| WO | 2011/108526 A1 | 9/2011 |
| WO | 2013/073292 A1 | 5/2013 |

OTHER PUBLICATIONS

Extended European Search Report (Application No. 13780926.5) dated May 19, 2015.
International Search Report and Written Opinion, International Application No. PCT/JP2013/059841, dated Jul. 2, 2013 (17 pages).
International Preliminary Report on Patentability, International Application No. PCT/JP2013/059841, dated Oct. 28, 2014 (16 pages).
Shimonishi, Yuta, et al., "Synthesis of Garnet-type $Li_{7-x}La_3Zr_2O_{12-1/2x}$ and its Stability in Aqueous Solutions," *Solid State Ionics*, vol. 183, pp. 48-53, dated 2011 (6 pages).
Buschmann, Henrik, et al., "Lithium Metal Electrode Kinetics and Ionic Conductivity of the Solid Lithium Ion Conductors '$Li_7La_3Zr_2O_{12}$' and $Li_{7-x}La_3Zr_{2-x}Ta_xO_{12}$ with Garnet-Type Structure," *Journal of Power Sources*, vol. 206, pp. 236-244, dated 2012 (9 pages).
Ohta, Shingo, et al. "High Lithium Ionic Conductivity in the Garnet-Type Oxide $Li_{7-x}La_3(Zr_{2-x}, Nb_x)O_{12}$ (X=0-2)," *Journal of Power Sources*, vol. 196, pp. 3342-3345, dated 2011 (4 pages).
Takeda, Yasuo, et al. "Lithium/Air Battery Using Aqueous Electrolyte," *The Institute of Electronics, Information and Communication Engineers*, IEICE Techincal Report EE 2009-59, CPM2009-151, dated 2010 (7 pages).
European Office Action (Application No. 13780926.5) dated Mar. 10, 2016.

* cited by examiner

LITHIUM AIR SECONDARY BATTERY

CROSS-REFERENCE TO RELATED APPLICATIONS

This application is a continuation application of PCT/JP2013/059841 filed Apr. 1, 2013, which claims priority to Japanese Patent Application No. 2012-101532 filed Apr. 26, 2012, the entire contents all of which are incorporated herein by reference.

BACKGROUND OF THE INVENTION

1. Field of the Invention

The present invention relates to a lithium-air secondary battery.

2. Description of the Related Art

One candidate of innovative batteries is a metal-air battery. In metal-air batteries, oxygen involved in the battery reaction is supplied from air, thus making it possible to utilize an inner space of the battery cell for packing a negative electrode active material at the maximum, and thereby achieving principally a high energy density.

The majority of the metal-air batteries currently proposed falls into lithium-air batteries. In an ordinary lithium-air battery, $O_2$ is reduced to produce $Li_2O$ at an air electrode (positive electrode) side during discharging while lithium is oxidized to produce $Li^+$ at a negative electrode side as shown in the following reaction formulas below. Then, the reverse reactions occur during charging.

Positive electrode: $O_2 + 4e^- + 4Li^+ \rightarrow 2Li_2O$

Negative electrode: $Li \rightarrow Li^+ + e^-$

For example, Patent Document 1 (JP 2010-176941A) discloses an lithium-air battery including a negative electrode comprising lithium metal, an electrolytic solution for the negative electrode, a solid electrolyte separator, through which lithium ions can pass exclusively, an electrolytic solution for an air electrode, and the air electrode, all of which are provided in this order. This document proposes using an organic electrolytic solution as the electrolytic solution for the negative electrode while using an alkaline aqueous electrolytic solution as the electrolytic solution for the air electrode. This configuration may cause a problem in that carbon dioxide in air passes through the air electrode and reacts with the alkaline aqueous electrolytic solution to produce an alkali metal carbonate, which deteriorates the electrolytic solution, and also may cause a problem in that the alkali metal carbonate blocks pores in the air electrode, and is thus not suitable for long-term use.

Patent Document 2 (WO2009/104570) discloses a suppression of the carbonate precipitation caused by carbon dioxide as described above by providing an anion-exchange polymer membrane at the interface between the air electrode and the alkaline electrolytic solution in metal-air batteries or alkaline fuel cells which utilize an alkaline aqueous electrolytic solution. In such a configuration, $OH^-$ ions are produced from oxygen and water on the catalyst surface in the air electrode, and the $OH^-$ ions move through the anion-exchange polymer membrane and the electrolytic solution to react with the metal negative electrode in the case of a metal-air battery, thus enabling battery operation. Deterioration of the air electrode performance is lower than the case without the anion-exchange polymer membrane, but the deterioration is not fully suppressed.

Non-Patent Document 1 (ECS Transactions, 28(32) 1-12 (2010)) discloses an aqueous lithium-air battery having a structure for preventing incorporation of carbon dioxide in air. In the structure, a film made of a lithium superionic conductor (LISICON) is used as a solid electrolyte separator to isolate a lithium metal negative electrode as in Patent Document 1, and an air electrode having a polymeric anion-exchange membrane is provided as in Patent Document 2. The use of an air electrode provided with an anion-exchange membrane according to Non-Patent Document 1 extends the battery life, but the problem caused by carbon dioxide is not fully solved. This is considered to be because the polymeric anion-exchange membrane cannot completely prevent penetration of carbon dioxide.

Meanwhile, recently, a layered double hydroxide (LDH) represented by the general formula $M^{2+}_{1-x}M^{3+}_x(OH)_2$ 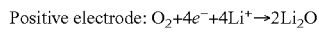 $A^{n-}_{x/n} \cdot mH_2O$ (wherein $M^{2+}$ is a divalent cation, $M^{3+}$ is a trivalent cation, and $A^{n-}$ is an anion having a valency of n) is known as a hydroxide-ion conductive solid electrolyte. For example, Patent Document 3 (WO2010/109670) proposes the use of a film of a layered double hydroxide as an alkaline electrolyte film for a direct alcohol fuel cell. Besides the layered double hydroxides, Patent Document 4 (WO2011/108526) discloses the use of a hydroxide-ion conductive solid electrolyte layer mainly composed of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, or $Sr_4Co_{1.6}Ti_{1.4}O_8(OH)_2 \cdot xH_2O$ for a fuel cell.

On the other hand, as a solid electrolyte having lithium ion conductivity, a garnet-type ceramic material having a $Li_7La_3Zr_2O_{12}$ (hereinafter referred to as LLZ)-based composition has been attracting attention. For example, Patent Document 5 (JP 2011-051800A) discloses that addition of Al together with Li, La, and Zr, which are the fundamental elements of LLZ, can enhance denseness and lithium ion conductivity. Patent Document 6 (JP 2011-073962A) discloses that addition of Nb and/or Ta together with Li, La, and Zr, which are the fundamental elements of LLZ, can further enhance lithium ion conductivity. Patent Document 7 (JP 2011-073963A) discloses that denseness can be further enhanced by containing Li, La, Zr, and Al and bringing the molar ratio of Li to La to 2.0 to 2.5.

Regarding the alkaline electrolytic solution, Patent Document 8 (JP 2012-33490A) discloses a lithium-air battery in which the aqueous electrolyte contains lithium hydroxide and lithium halide, and describes that by including lithium halide in the aqueous electrolyte, the reaction between lithium hydroxide and a solid electrolyte film is suppressed, and thus the negative electrode can be protected.

CITATION LIST

Patent Documents

Patent Document 1: JP2010-176941A
Patent Document 2: WO2009/104570
Patent Document 3: WO2010/109670
Patent Document 4: WO2011/108526
Patent Document 5: JP 2011-051800A
Patent Document 6: JP 2011-073962A
Patent Document 7: JP 2011-073963A
Patent Document 8: JP 2012-33490A

Non-Patent Documents

Non-Patent Document 1: Philippe Stevens et al., "Development of a lithium air rechargeable battery", ECS Transactions, 28(32) 1-12 (2010)

SUMMARY OF THE INVENTION

The inventors have currently found that by interposing a hydroxide-ion conductive solid electrolyte functioning as an anion exchanger between an air electrode and an alkaline electrolytic solution and by using a lithium-ion conductive solid electrolyte functioning as a separator for separating a negative electrode from the alkaline electrolytic solution, it is possible to effectively prevent deterioration of the alkaline electrolytic solution, the air electrode, and the negative electrode and thus to achieve a lithium-air secondary battery that has a long life and high long-term reliability.

Therefore, an object of the present invention is to provide a lithium-air secondary battery that can effectively prevent deterioration of an alkaline electrolytic solution, an air electrode, and a negative electrode and has a long life and high long-term reliability.

According to an aspect of the present invention, there is provided a lithium-air secondary battery comprising:

an air electrode functioning as a positive electrode;
an anion exchanger provided in close contact with one side of the air electrode, wherein the anion exchanger is composed of a hydroxide-ion conductive inorganic solid electrolyte;
a separator provided away from the anion exchanger, wherein the separator is composed of a lithium-ion conductive inorganic solid electrolyte;
a negative electrode provided so as to be capable of supplying and receiving lithium ions to and from the separator, wherein the negative electrode comprises lithium; and
an alkaline electrolytic solution filled between the anion exchanger and the separator.

DETAILED DESCRIPTION OF THE INVENTION

Lithium-Air Secondary Battery

Figure 1:
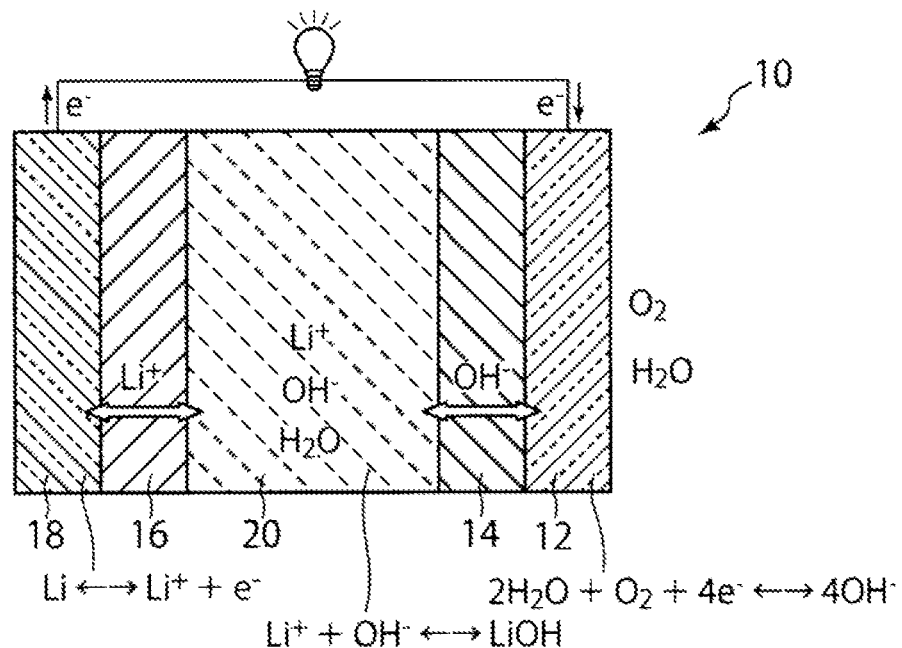
FIG. 1 is a conceptual diagram for explaining a lithium-air secondary battery according to the present invention.

FIG. 1 conceptually shows the configuration of a lithium-air secondary battery according to the present invention. A lithium-air secondary battery 10 shown in FIG. 1 includes an air electrode 12 functioning as a positive electrode, an anion exchanger 14, a separator 16, a negative electrode 18, and an alkaline electrolytic solution 20. The anion exchanger 14 is provided in close contact with one side of the air electrode 12 and composed of a hydroxide-ion conductive inorganic solid electrolyte. The separator 16 is provided away from the anion exchanger 14 and composed of a lithium-ion conductive inorganic solid electrolyte. The negative electrode 18 is provided so as to be capable of supplying and receiving lithium ions to and from the separator 16 and comprises lithium. The alkaline electrolytic solution 20 is filled between the anion exchanger 14 and the separator 16.

As described above, in the lithium-air secondary battery 10 of the present invention, the anion exchanger 14 composed of a hydroxide-ion conductive inorganic solid electrolyte is provided in close contact with one side of the air electrode 12. According to this configuration, since the anion exchanger 14 composed of a hydroxide-ion conductive inorganic solid electrolyte is interposed between the air electrode 12 and the alkaline electrolytic solution 20, hydroxide ions (OH$^-$) produced in the air electrode 12 can pass exclusively through the anion exchanger 14 to the alkaline electrolytic solution 20 and, on the other hand, incorporation of undesired substances such as carbon dioxide contained in air can be inhibited. Thereby, deterioration of the alkaline electrolytic solution is prevented, and a lithium-air battery having a long life can be achieved. At the same time, the interposition of the anion exchange membrane 14 can prevent lithium ions (Li$^+$) in the alkaline electrolytic solution 20 from migrating to the air electrode 12 so as to avoid the problem in that precipitates of LiOH are formed in pores in the air electrode 12 to block the pores, contributing to the enhancement of long-term reliability. In addition, the use of a lithium-ion conductive solid electrolyte having excellent denseness as the separator 16 for separating the alkaline electrolytic solution 20 from the negative electrode 18 can effectively prevent a leakage of the alkaline electrolytic solution 20 and hydroxide ions contained therein from the separator as well as negative electrode deterioration caused by the reaction between the negative electrode 18 and the alkaline electrolytic solution or hydroxide ions resulting from the leakage. As a result, according to the present invention, a lithium-air secondary battery having a long life and high long-term reliability can be provided.

That is, in the lithium-air secondary battery 10 according to the present invention, the reactions in the air electrode (positive electrode) 12, the electrolytic solution 20, and the negative electrode 18 during discharging are as follows, and the reverse reactions occur during charging.

$$\text{Positive electrode: } 2H_2O+O_2+4e^- \rightarrow 4OH^-$$

$$\text{Electrolytic solution: } Li^+ + OH^- \rightarrow LiOH$$

$$\text{Negative electrode: } Li \rightarrow Li^+ + e^-$$

In the lithium-air secondary battery 10 of the present invention, since the anion exchanger 14 is provided in close contact with one side of the air electrode 12, the alkaline electrolytic solution 20 exists only on the negative electrode 18 side of the anion exchanger 14 and does not exist on the air electrode 12 side. In this case, with the anion exchanger being capable of absorbing water in its molecular structure, permeating $H_2O$ can be used for the positive electrode reaction, and moisture in air can be used for the positive electrode reaction as well. Therefore, for efficient battery operation, it is preferable that the battery of the present invention is used in the presence of humidified air.

Air Electrode (Positive Electrode)

The air electrode 12 is not particularly limited as long as it functions as a positive electrode in a lithium-air battery, and a variety of air electrodes that can use oxygen as a positive electrode active material can be used. Preferable examples of the air electrode 12 include carbon materials having a redox catalyst function such as graphite, metals having a redox catalyst function such as platinum and nickel, inorganic oxides having a redox catalyst function such as perovskite-type oxides, manganese dioxide, nickel oxide, cobalt oxide, and spinel oxides, and like catalyst materials.

The air electrode 12 is preferably a porous carbon material on which a catalyst having a redox catalyst function is supported. In this case, a catalyst material as described above may be formed into a paste and applied to the air electrode side of a hydroxide-ion conductive solid electrolyte plate composed of a Mg—Al layered double hydroxide (LDH) to form an air electrode.

Also, the air electrode 12 may be a porous material composed of fine inorganic oxide particles having a redox catalyst function, and in such a case, it is preferable that the anion exchanger is formed in a film form on one side of the porous material. In this case, a laminate structure of an air electrode and an inorganic solid electrolyte body may be formed by sintering powder particles of a perovskite-type oxide to form a porous body, and forming a dense film of a Mg—Al layered double hydroxide (LDH) on one side of this porous body by a hydrothermal method or the like.

The air electrode 12 may contain an electrically conductive material. The electrically conductive material is not particularly limited as long as it is a material having electrical conductivity, preferable examples of which include carbon blacks such as ketchen black, acetylene black, channel black, furnace black, lamp black, and thermal black, graphites such as natural graphite, e.g., flake graphite, artificial graphite, and expanded graphite, electrically conductive fibers such as carbon fiber and metal fiber, powders of metals such as copper, silver, nickel, and aluminum, organic electrically conductive materials such as polyphenylene derivatives, and any mixtures thereof.

The air electrode 12 may contain a binder. The binder may be a thermoplastic resin or a thermosetting resin and is not particularly limited. Preferable examples of the binder include polyethylene, polypropylene, polytetrafluoroethylene (PTFE), polyvinylidene fluoride (PVDF), styrene-butadiene rubber, tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinyl idene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, and any mixtures thereof.

The air electrode 12 is preferably a mixture or composite including a material composed of a hydroxide-ion conductive solid electrolyte of the same kind as the anion exchanger 14. In such a configuration, the surface area of the anion exchanger is increased, and it is thus possible to allow $OH^-$ ions produced in the positive electrode reaction to migrate more effectively. This is also effective in other air batteries, such as zinc-air batteries, which include an anion exchanger.

The air electrode 12 may include a positive electrode current collector on the surface opposite to the anion exchanger 14. In this case, it is preferable that the positive electrode current collector has gas permeability to supply air to the air electrode 12. Preferable examples of the positive electrode current collector include plates or meshes of metals such as stainless steel, copper, and nickel, carbon paper, oxide electrical conductors, and the like, with stainless steel gauze being particularly preferable in terms of corrosion resistance and gas permeability.

Anion Exchanger

The anion exchanger 14 can be any member composed of a hydroxide-ion conductive inorganic solid electrolyte and, through which hydroxide ions produced in the air electrode 12 can pass selectively to the alkaline electrolytic solution 20. That is, the anion exchanger 14 inhibits incorporation of undesirable substances such as carbon dioxide contained in air to the battery and, at the same time, inhibits migration of lithium ions in the alkaline electrolytic solution 20 to the air electrode 12. Therefore, it is desirable that the anion exchanger 14 is impervious to carbon dioxide. Accordingly, the hydroxide-ion conductive inorganic solid electrolyte is preferably a dense ceramic. It is preferable that such a dense hydroxide-ion conductive inorganic solid electrolyte body has a relative density of 90% or greater, more preferably 92% or greater, and even more preferably 95% or greater as measured by the Archimedes method, but as long as the inorganic solid electrolyte can inhibit incorporation of undesirable substances such as carbon dioxide contained in air to the battery, the relative density is not limited thereto.

According to a preferable embodiment of the present invention, the hydroxide-ion conductive inorganic solid electrolyte is a layered double hydroxide (LDH). It is preferable that such a layered double hydroxide is densified by a hydrothermal solidifying method. Therefore, a mere green compact that has not undergone hydrothermal solidification is not dense and is brittle in a solution, and is thus not preferable as the inorganic solid electrolyte body of the present invention. As a matter of course, any solidifying method, not just a hydrothermal solidifying method, is usable as long as a dense and hard inorganic solid electrolyte body can be obtained.

A particularly preferable layered double hydroxide (LDH) has a basic composition represented by the general formula:

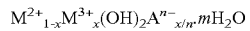

wherein $M^{2+}$ is at least one divalent cation, $M^{3+}$ is at least one trivalent cation, $A^{n-}$ is an anion having a valency of n, n is an integer of 1 or greater, x is 0.1 to 0.4, and m is any number greater than 0 that indicates the molar number of water. Examples of $M^{2+}$ include $Mg^{2+}$, $Ca^{2+}$, $Sr^{2+}$, $Ni^{2+}$, $Co^{2+}$, $Fe^{2+}$, $Mn^{2+}$, and $Zn^{2+}$, examples of $M^{3+}$ include $Al^{3+}$, $Fe^{3+}$, $Ti^{3+}$, $Y^{3+}$, $Ce^{3+}$, $Mo^{3+}$, and $Cr^{3+}$, and examples of $A^{n-}$ includes $CO_3^{2-}$ and $OH^-$. Regarding $M^{2+}$ and $M^{3+}$, these examples of respective ions can be used solely or also in combination. In particular, a Mg—Al LDH in which $M^{2+}$ is $Mg^{2+}$, $M^{3+}$ is $Al^{3+}$, and $A^{n-}$ is $CO_3^{2-}$ is preferable, Patent Document 3 (WO2010/109670) discloses that this compound has hydroxide-ion conductivity and is used as an alkaline electrolyte membrane for a direct alcohol fuel cell. However, the alkaline electrolyte film in Patent Document 3 is merely a film obtained by compressing a Mg—Al layered double hydroxide powder with a cold press or the like, and bonding of powder particles is not strong. It is understood that such a technique is used because powder of hydroxide, unlike so-called oxide ceramics, cannot be unified and densified by sintering. $M^{3+}$ in the general formula above may be partially or entirely replaced with a cation having a valency of 4 or greater, and in such a case, the factor x/n of the anion $A^{n-}$ in the general formula above may be suitably changed. Thus, in order to attain an inorganic solid electrolyte body usable in the present invention, it is preferable that pellets obtained by compressing raw material powder are densified by a hydrothermal solidifying method. This technique is extremely effective for unifying and densifying a layered double hydroxide, especially an Mg—Al layered double hydroxide. The hydrothermal solidifying method can be carried out in a pressure vessel in which pure water and a plate-shaped green compact have been placed, at a temperature of 120 to 250° C., preferably 180 to 250° C., for 2 to 24 hours, preferably 3 to 10 hours.

According to another preferable embodiment of the present invention, the hydroxide-ion conductive solid electrolyte may have at least one basic composition selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$. These inorganic solid electrolytes are disclosed as hydroxide-ion conductive solid electrolytes for fuel cells in Patent Document 4 (WO2011/108526) and can be obtained by preparing a dense sintered body having the aforementioned basic composition by sintering, and then performing reduction/hydration treatment to exert hydroxide ion conductivity.

The shape of the anion exchanger 14 is not particularly limited, and may be in any of dense plate forms and film forms. The anion exchanger shaped in a plate form is preferable in terms of making it possible to more effectively inhibiting incorporation of carbon dioxide and migration of lithium ions to the air electrode. As a matter of course, it is also preferable that the anion exchanger 14 is shaped in a film form as long as it has such denseness that the incorporation of carbon dioxide and migration of Li ions to the air electrode are sufficiently inhibited. A preferable thickness of the plate-like inorganic solid electrolyte body is 0.01 to 0.5 mm, more preferably 0.01 to 0.2 mm, and even more preferably 0.01 to 0.1 mm. Also, the greater the hydroxide ion conductivity of the inorganic solid electrolyte, the more desirable it is, and the inorganic solid electrolyte body typically has a conductivity of $10^{-4}$ to $10^{-1}$ S/m.

The anion exchanger 14 may be a composite of particles composed of a hydroxide-ion conductive inorganic solid electrolyte and an auxiliary constituent that assists the particles to become dense and hard. Alternatively, the anion exchanger 14 may be a composite of a porous body with open pores and an inorganic solid electrolyte, e.g. a layered double hydroxide, where the porous body functions as a substrate and the inorganic solid electrolyte is deposited and grown in the pores so as to fill the pores of the porous body. Examples of materials that constitute the porous body include ceramics (e.g. alumina or zirconia) and insulating materials such as porous sheets composed of foamed resins or fibrous materials.

In order to more stably retain hydroxide ions on the anion exchanger 14, a porous substrate may be provided on one surface or both surfaces of the anion exchanger 14. In the case of providing a porous substrate on one surface of the anion exchanger 14, a technique may be employed in which a porous substrate is provided and a film of the inorganic solid electrolyte is formed on this porous substrate. On the other hand, in the case of providing a porous substrate on both surfaces of the anion exchanger 14, it is possible that a raw material powder of the inorganic solid electrolyte is sandwiched between two porous substrates, and densification is performed thereon.

Separator

The separator 16 is composed of a lithium-ion conductive inorganic solid electrolyte, separates the alkaline electrolytic solution 20 from the negative electrode 18, and thereby can prevent the alkaline electrolytic solution 20 and hydroxide ions from directly contacting and reacting with the negative electrode 18. Therefore, the inorganic solid electrolyte is desirably a dense ceramic, through which lithium ions can pass selectively but the alkaline electrolytic solution, hydroxide ion, and the like cannot pass. Also, making the inorganic solid electrolyte to be harder than metal lithium makes it possible to reliably block a growth of lithium dendrites from the negative electrode during charging at the separator 18 and avoid a short circuit between the positive and negative electrodes caused by the lithium dendrites. Accordingly, an organic solid electrolyte separator is not used in the present invention. It is desirable that the inorganic solid electrolyte is dense because existence of continuous holes, through which the alkaline electrolytic solution, hydroxide ions, and the like pass, lead to deterioration of the negative electrode. The inorganic solid electrolyte preferably has a relative density of, for example, 90% or greater, more preferably 95% or greater, and even more preferably 99% or greater. Such a high relative density can be achieved by suitably controlling, for example, the particle diameter and the sintering temperature of the raw material powder of the inorganic solid electrolyte. The relative density can be measured by the Archimedes method. The inorganic solid electrolyte preferably has a lithium ion conductivity of $10^{-5}$ S/cm or greater, and more preferably $10^{-4}$ S/cm or greater.

A preferable example of the lithium-ion conductive inorganic solid electrolyte is at least one selected from the group consisting of garnet-based ceramic materials, nitride-based ceramic materials, perovskite-based ceramic materials, and phosphate-based ceramic materials. Examples of garnet-based ceramic materials include Li—La—Zr—O-based materials (specifically, $Li_7La_3Zr_2O_{12}$ and the like) and Li—La—Ta—O-based materials (specifically, $Li_7La_3Ta_2O_{12}$ and the like). The materials disclosed in Patent Document 5 (JP 2011-051800A), Patent Document 6 (JP 2011-073962A), and Patent Document 7 (JP 2011-073963A) are also usable. Examples of nitride-based ceramic materials include $Li_3N$, LiPON, and the like. Examples of perovskite-based ceramic materials include Li—La—Ti—O-based materials (specifically, $LiLa_{1-x}Ti_xO_3$ (0.04≤x≤0.14) and the like). Examples of phosphate-based ceramic materials include Li—Al—Ti—P—O, Li—Al—Ge—P—O, and Li—Al—Ti—Si—P—O (specifically, $Li_{1+x+y}Al_xTi_{2-x}Si_yP_{3-y}O_{12}$ (0≤x≤0.4, 0<y≤0.6) and the like).

A particularly preferable lithium-ion conductive inorganic solid electrolyte is a garnet-based ceramic material in terms of not undergoing a reaction even when being in direct contact with negative electrode lithium. Especially, an oxide sintered body having a garnet-type or garnet-like crystal structure comprising Li, La, Zr, and O is preferable because it has excellent sinterability and is thus easily densified and it also has high ion conductivity. A garnet-type or garnet-like crystal structure having this type of composition is called an LLZ crystal structure and has an XRD pattern similar to X-ray diffraction file No. 422259 ($Li_7La_3Zr_2O_{12}$) of Cambridge Structural Database (CSD). Compared with No. 422259, constituent elements may be different, the Li concentration in the ceramic or other features may be different, and therefore the diffraction angle and the diffraction intensity ratio may be different. The molar ratio of Li to La, i.e., Li/La, is preferably 2.0 or greater and 2.5 or less, and the molar ratio of Zr to La, i.e., Zr/La, is preferably 0.5 or greater and 0.67 or less. This garnet-type or garnet-like crystal structure may further comprise Nb and/or Ta. That is, partially replacing Zr of LLZ with either one or both of Nb and Ta can enhance conductivity in comparison with non-replaced one. The amount (molar ratio) of Zr replaced with Nb and/or Ta is preferably such an amount that the molar ratio (Nb+Ta)/La is 0.03 or greater and 0.20 or less. It is preferable that this garnet oxide sintered body further comprises Al and/or Mg, and these elements may exist in the crystal lattice or elsewhere other than the crystal lattice. The amount of Al added is preferably 0.01 to 1 wt % of the sintered body, and the molar ratio of Al to La, i.e., Al/La, is preferably 0.008 to 0.12. The amount of Mg added is preferably 0.01 to 1 wt % and more preferably 0.05 to 0.30 wt %. The molar ratio of Mg to La, i.e., Mg/La, is preferably 0.0016 to 0.07.

Negative Electrode

The negative electrode 18 comprises lithium and is not particularly limited as long as lithium oxidizes to lithium ions in the negative electrode during discharging, and can comprise metal lithium, a lithium alloy, a lithium compound, or the like. While lithium is an excellent negative electrode material in terms of having a higher theoretical voltage and electrochemical equivalent than other metal elements, lithium may cause dendrites to grow during charging. However, according to the present invention, penetration of dendrites can be inhibited by the inorganic solid electrolyte separator 16, and a short circuit between the positive and negative electrodes can be avoided. Preferable examples of materials constituting the negative electrode 18 include metal lithium, lithium alloys, lithium compounds, and the like. Examples of lithium alloys include lithium aluminum, lithium silicon, lithium indium, lithium tin, and the like, and examples of lithium compounds include lithium nitride, lithium carbon, and the like, with metal lithium being more preferable from the large-capacity and cycle stability viewpoint.

The negative electrode 18 may include a negative electrode current collector. Preferable examples of the negative electrode current collector include plates and meshes of metals such as stainless steel, copper, nickel, platinum, and noble metals, carbon paper, oxide electrical conductors, and the like.

As long as the negative electrode 18 is provided so as to be capable of supplying and receiving lithium ions to and from the separator, the arrangement of the negative electrode is not particularly limited. Therefore, the negative electrode 18 may be configured to be in direct contact with the separator 16 or in indirect contact therewith via a non-aqueous electrolytic solution.

Alkaline Electrolytic Solution

The alkaline electrolytic solution 20 is an alkaline aqueous electrolytic solution. The alkaline electrolytic solution 20 is preferably an aqueous solution containing lithium ion from the chargeability viewpoint. Nevertheless, the alkaline electrolytic solution does not necessarily contain lithium ions in a fully charged state as lithium ions are sufficiently supplied from the negative electrode 18 during discharging. While lithium ions in the alkaline electrolytic solution are involved in the negative electrode reaction, hydroxide ions in the alkaline electrolytic solution are involved in the positive electrode reaction. Preferable examples of the alkaline electrolytic solution include those in which lithium hydroxide is dissolved in water or an aqueous solvent, and an aqueous lithium hydroxide solution is particularly preferable. Also, the alkaline electrolytic solution may contain lithium halide (see, for example, Patent Document 8), and preferable examples of the lithium halide include lithium fluoride (LiF), lithium chloride (LiCl), lithium bromide (LiBr), lithium iodide (Lip, and the like.

In order to increase the charging capacity, the alkaline electrolytic solution 20 may be mixed in advance with a powder of, for example, lithium hydroxide monohydrate as a discharge product, and this is particularly advantageous when a battery is constructed to be in a fully discharged state. That is, where the lithium ion concentration and the hydroxide ion concentration in the electrolytic solution should decrease as charging progresses, lithium ions and hydroxide ions are newly supplied to the electrolytic solution due to the dissolution of the lithium hydroxide monohydrate powder in the electrolytic solution.

In order to prevent the electrolytic solution from leaking, the electrolytic solution may be gelated. As a gelling agent, it is desirable to use a polymer that absorbs the solvent of the electrolytic solution and swells, and polymers such as polyethylene oxide, polyvinyl alcohol, and polyacrylamide as well as starch are usable.

Battery Cell

The air electrode 12, anion exchanger 14, alkaline electrolytic solution 20, separator 16, and negative electrode 18 can be accommodated in a battery cell. This cell preferably has air holes for allowing the air electrode 12 to contact outside air. The material, form, and structure of the battery cell are not particularly limited, but it is desired that the battery cell is configured in a way such that air (especially carbon dioxide) does not enter the electrolytic solution or the electrolytic solution does not leak.

It is preferable that the battery cell includes a positive electrode case and a negative electrode case in a way such that they can be fitted to each other via gaskets. Also, it is preferable that the battery cell has a configuration in which an electrically conductive buffer is disposed between the inner wall of the battery cell (especially the negative electrode case) and the negative electrode to maintain the connection between the negative electrode 18 and the battery cell or negative electrode terminal constantly regardless of the change in thickness of the negative electrode caused by charging and discharging. That is, since the thickness of the electrically conductive buffer can elastically change, the connection between the negative electrode 18 and the battery cell (especially the negative electrode case) can be maintained constantly. Preferable examples of the electrically conductive buffer include carbon felt, a web obtained by forming stainless steel metal fiber into fluff, and the like.

Figure 2:
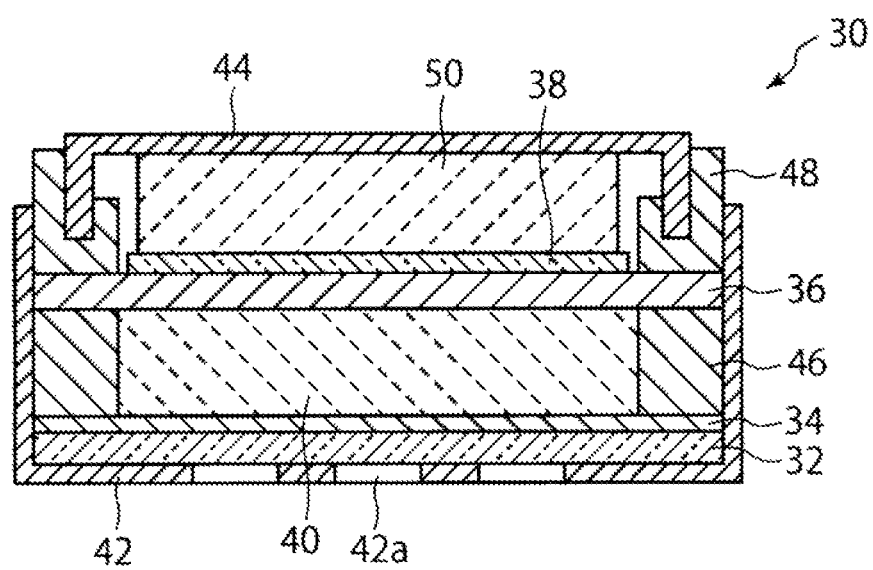
FIG. 2 is a schematic cross-sectional view showing an example of a lithium-air secondary battery according to the present invention.

A lithium-air secondary battery according to this embodiment is shown in FIG. 2. A lithium-air secondary battery 30 shown in this drawing includes a positive electrode case 42 accommodating at least an air electrode 32 and a negative electrode case 44 provided on the negative electrode 38 side. The positive electrode case 42 is provided with air holes 42a so that air can reach the air electrode 32. The positive electrode case 42 is fitted to the negative electrode case 44 via gaskets 46 and 48 and a separator 36 placed therebetween, thus securing airtightness inside the battery cell. Specifically, the air electrode 32 and an anion exchanger 34 are stacked in this order in the bottom part of the positive electrode case 42, the positive electrode gasket 46 is placed on the anion exchanger 34 along the inner circumferential edge of the positive electrode case 42, and the space formed by the positive electrode gasket 46 and the anion exchanger 34 is filled with an electrolytic solution 40 so as to reach the same height as the upper end of the positive electrode gasket 46. The separator 36 is provided so as to be in contact with the positive electrode gasket 46 and confine the electrolytic solution 40 to the space formed by the positive electrode gasket 46 and the anion exchanger 34. While a negative electrode 38 and an electrically conductive buffer 50 are stacked on the central part of the separator 36, the positive electrode gasket 48 is placed along the inner circumferential edge of the positive electrode case 42 above the separator 36.

The lithium-air secondary battery 30 may be constructed to be in a fully discharged state or may be constructed to be in a fully charged state. That is, in a case where the battery is constructed to be in a fully discharged state, first, the negative electrode 38 may be configured only with a negative electrode current collector, and then metal lithium may be precipitated during charging to impart a function as a negative electrode. On the other hand, in a case where the battery is constructed to be in a fully charged state, metal lithium and a negative electrode current collector may be stacked on the separator 36 to configure the negative electrode 38. The outer diameter of the negative electrode case 44 is designed to be smaller than the inner diameter of the positive electrode case 42, and the negative electrode case 44 is fitted to the positive electrode case 42 via the negative electrode gasket 48 placed along the inner circumferential edge of the positive electrode case 42. In this way, the lithium-air secondary battery 30 of this embodiment has a configuration in which the air electrode 32, anion exchanger 34, electrolytic solution 40, separator 36, negative electrode 38, and electrically conductive buffer 50 are sandwiched between the positive electrode case 42 and the negative electrode case 44 via the gaskets 46 and 48, and thereby the air-tightness and the water-tightness of portions other than the air holes 32a are ensured. Therefore, the material, form, and structure of the gaskets 46 and 48 are not particularly limited as long as air-tightness and water-tightness can be secured, but it is preferable that the gaskets are composed of an insulating material such as nylon. Such a lithium-air secondary battery 30 can reliably inhibit air constituents (especially carbon dioxide) from intruding into the interior of the battery, especially into the electrolytic solution, by means of the anion exchanger 34 and the gaskets 46 and 48.

The lithium-air secondary battery of the present invention can be in any form and, for example, can be in a coin, button, sheet, laminate, cylindrical, flat, prismatic, or like form. Also, the lithium-air secondary battery is applicable to a large-sized secondary battery used in electric vehicles or the like as well as a small-sized secondary battery.

The lithium-air secondary battery of the present invention may further comprise a positive electrode that is used exclusively for charging (see, for example, Patent Document 1). With the charge-only positive electrode being provided, even when the hydroxide-ion conductivity of the anion exchanger is low, charging can be rapidly carried out because it is possible to use the charge-only positive electrode without taking advantage of the anion exchanger during charging. Moreover, generation of oxygen in the air electrode during charging can be avoided, and thus corrosion and deterioration of the air electrode can be prevented. This charge-only electrode functions effectively also in other air batteries such as zinc-air batteries provided with an anion exchanger. A preferable example of the charge-only positive electrode is a carbon or metal titanium mesh.

EXAMPLES

The present invention will now be more specifically described by the following examples.

Example 1

Preparation of Anion Exchanger Composed of Hydroxide-Ion Conductive Inorganic Solid Electrolyte A mixed aqueous solution containing $Mg(NO_3)_2$ and $Al(NO_3)_3$ was prepared in a way such that a molar ratio of Mg/Al was 3/1. This mixed aqueous solution was added to an aqueous $Na_2CO_3$ solution dropwise to give precipitates. At this time, a sodium hydroxide solution was added to control the solution pH to a constant level of about 10. The resulting precipitates were filtered, washed, and dried to obtain a layered double hydroxide powder having an average primary particle diameter of 0.5 μm or less and an average secondary particle diameter of 5 μm or less. This layered double hydroxide powder was pressed by a uniaxial pressing method to give a plate-like green compact. Pure water and the plate-like green compact were placed in a pressure vessel and heated at 150° C. for 4 hours to give a plate-like inorganic solid electrolyte body as an anion exchanger. The resulting inorganic solid electrolyte body had a relative density of 95% as measured by the Archimedes method.

Example 2

Preparation of Separator Composed of Lithium-Ion Conductive Inorganic Solid Electrolyte As raw material components for preparation of raw materials for firing, lithium hydroxide (Kanto Chemical Co., Inc.), lanthanum hydroxide (Shin-Etsu Chemical Co., Ltd.), zirconium oxide (Tosoh Corporation), and tantalum oxide were provided. These powders were weighed and blended so as to give $LiOH:La(OH)_3:ZrO_2:Ta_2O_5=7:3:1.625:0.1875$ and mixed in a grinding mill to give raw materials for firing.

As a first firing step, the raw materials for firing was placed in an alumina crucible, heated in air with a temperature ramp rate of 600° C./hour, and kept at 900° C. for 6 hours.

As a second firing step, $\gamma$-$Al_2O_3$ and/or magnesium oxide was added to the powder obtained in the first firing step such that the Al concentration was 0.16 wt %, and the resulting powder was mixed with grinding ball and pulverized for 3 hours using a vibration mill. After the resulting pulverized powder was sieved, the resulting powder was pressed into pellets at about 100 MPa using a metal mold. The resulting pellets were placed on a magnesia setter, put into a magnesia pot together with the setter, heated in an Ar atmosphere with a temperature ramp rate of 200° C./hour, and kept at 1000° C. for 36 hours to give a 35 mm×18 mm sintered body with a thickness of 11 mm, which was machined into a 10 mm×10 mm separator with a thickness of 0.2 mm. Concerning the Ar atmosphere, an electric furnace with a volume of about 3 L was evacuated to vacuum in advance, and then Ar gas with a purity of 99.99% or greater was flown through the furnace at 2 L/min. In this way, a separator composed of a lithium-ion conductive inorganic solid electrolyte was obtained.

After the upper and lower surfaces of the resulting sintered body sample were polished, the following various evaluations and measurements were carried out. X-ray diffraction measurement carried out on the sintered body sample revealed that a crystal structure similar to Cambridge Structural Database (CSD) X-ray diffraction file No. 422259 ($Li_7La_3Zr_2O_{12}$) was obtained. Accordingly, it was confirmed that the obtained sample had a feature of an LLZ crystal structure. To find out the Al and Mg contents of the sintered body sample, a chemical analysis by inductively coupled plasma optical emission spectrometry (ICP analysis) was carried out and revealed that the Al content was 0.15 wt % and the Mg content was 0.06 wt %. Moreover, after measuring the weight of the sintered body sample, the diameters of the sintered body sample at several positions were measured using a micrometer, and the average value was calculated. Thereafter, the thicknesses of pellets were measured in the same manner to calculate the volume of the sintered body sample, and then the density was calculated to be 5.04 g/cm³. A test piece having a specific shape was cut out from the sample, and its four-point flexural strength measured by a strength tester (3366 dual column tabletop testing system manufactured by INSTRON) in accordance with JIS R1601 (2008) was 134 MPa.

Example 3

Preparation of Lithium-Air Secondary Battery

A lithium-air secondary battery 30 as shown in FIG. 2 is assembled using the anion exchanger prepared in Example 1 and the separator prepared in Example 2. First, a circular stainless steel positive electrode case 42 having air holes 42a is provided. An air electrode 32 composed of a positive electrode current collector made from stainless steel wire gauze to which platinum-supported carbon has been applied, and the anion exchanger 34 prepared in Example 1, are stacked at the bottom of the positive electrode case 42. An insulating positive electrode gasket 46 made of nylon is placed along the inner circumferential edge of the positive electrode case 42 so as to tightly contact with the outer edge of the anion exchanger. Next, the positive electrode case 42 is filled with a discharge product-containing electrolytic solution 40 in which a lithium hydroxide monohydrate powder and a saturated aqueous lithium hydroxide solution are mixed. A separator 36 is placed so as to be in contact with the positive electrode gasket 46 and confine the electrolytic solution 40 to the space formed by the positive electrode gasket 46 and the anion exchanger 34. A negative electrode current collector 38 composed of a thick stainless steel film is formed in advance by a sputtering method on the separator 36. Carbon felt as an electrically conductive buffer 50 is placed on the current collector 38 on the side opposite the separator 36. The members are sandwiched between the positive electrode case 42 and the negative electrode case 44 using the negative electrode gasket 48, and the alkaline electrolytic solution 40 on the positive electrode side and the space on the negative electrode side are hermetically sealed from each other via the separator 35, and thus the lithium-air secondary battery 30 having air-tightness and water-tightness is obtained.

The lithium-air battery 30 thus obtained is in a fully discharged state. That is, metal lithium is not present in the negative electrode current collector 38 in this state. When this battery is charged, lithium ions in the alkaline electrolytic solution 40 pass through the separator 36 and precipitate as metal lithium at the interface between the negative electrode current collector 38 and the separator, and a negative electrode is thus formed. On the other hand, hydroxide ions in the electrolytic solution 40 are converted into oxygen and water in the air electrode 32 and released to the outside. Since the lithium ion concentration and the hydroxide ion concentration in the electrolytic solution decrease as charging progresses, the lithium hydroxide monohydrate powder dissolves in the electrolytic solution, the powder disappears, and charging terminates. At this time, the distance between the negative electrode current collector 38 and the negative electrode case 44 changes because of the precipitation of metal lithium at the interface between the separator 36 and the negative electrode current collector 38. However, the connection between the negative electrode current collector 38 and the negative electrode case 44 can be maintained constantly since the thickness of the electrically conductive buffer 50 can elastically change. It is also possible to assemble a battery by placing metal lithium between the separator 36 and the negative electrode current collector 38 instead of mixing lithium hydroxide monohydrate powder into the electrolytic solution 50, and the battery assembled in this way is in a fully charged state.

What is claimed is:

1. A lithium-air secondary battery comprising:
   an air electrode functioning as a positive electrode;
   an anion exchanger in contact with one side of the air electrode, wherein the anion exchanger is composed of a hydroxide-ion conductive inorganic solid electrolyte having a relative density of 90% or greater;
   a separator provided away from the anion exchanger, wherein the separator is composed of a lithium-ion conductive inorganic solid electrolyte;
   a negative electrode provided so as to be capable of supplying and receiving lithium ions to and from the separator, wherein the negative electrode comprises lithium; and
   an alkaline electrolytic solution filled between the anion exchanger and the separator.

2. The lithium-air secondary battery according to claim 1, wherein the anion exchanger is impervious to carbon dioxide.

3. The lithium-air secondary battery according to claim 1, wherein the hydroxide-ion conductive inorganic solid electrolyte is a layered double hydroxide densified by a hydrothermal solidifying method.

4. The lithium-air secondary battery according to claim 1, wherein the hydroxide-ion conductive inorganic solid electrolyte is composed of a layered double hydroxide having a basic composition represented by a general formula:

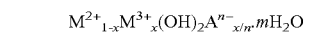

wherein $M^{2+}$ is $Mg^{2+}$, $M^{3+}$ is $Al^{3+}$, $A^{n-}$ is $CO_3^{2-}$, n is an integer of 1 or greater, x is 0.1 to 0.4, and m is any number greater than 0 that indicates the molar number of water.

5. The lithium-air secondary battery according to claim 1, wherein the hydroxide-ion conductive solid electrolyte has at least one basic composition selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$.

6. The lithium-air secondary battery according to claim 1, wherein the hydroxide-ion conductive inorganic solid electrolyte is in a plate form.

7. The lithium-air secondary battery according to claim 1, wherein the lithium-ion conductive inorganic solid electrolyte has a relative density of 90% or greater.

8. The lithium-air secondary battery according to claim 1, wherein the lithium-ion conductive inorganic solid electrolyte is at least one selected from the group consisting of garnet-based ceramic materials, nitride-based ceramic materials, perovskite-based ceramic materials, and phosphate-based ceramic materials.

9. The lithium-air secondary battery according to claim 1, wherein the lithium-ion conductive inorganic solid electrolyte is a garnet-based ceramic material.

10. The lithium-air secondary battery according to claim 9, wherein the garnet-based ceramic material is an oxide sintered body having a garnet crystal structure comprising Li, La, Zr, and O.

11. The lithium-air secondary battery according to claim 10, wherein the garnet crystal structure further comprises Nb and/or Ta.

12. The lithium-air secondary battery according to claim 10, wherein the oxide sintered body further comprises Al and/or Mg.

13. The lithium-air secondary battery according to claim 1, wherein the air electrode is a porous carbon material supporting a catalyst having a redox catalyst function.

14. The lithium-air secondary battery according to claim 1, further comprising a battery cell that has an air hole for allowing the air electrode to contact outside air and accommodates the air electrode, the anion exchanger, the alkaline electrolytic solution, the separator, and the negative electrode.

15. The lithium-air secondary battery according to claim 1, wherein the negative electrode is in direct contact with the separator.

16. The lithium-air secondary battery according to claim 1, wherein the alkaline electrolytic solution is a lithium ion-containing aqueous solution.

17. The lithium-air secondary battery according to claim 1, wherein the alkaline electrolytic solution is an aqueous lithium hydroxide solution.

* * * * *